H. D. PRATT.
PROCESS OF HARVESTING ICE.
APPLICATION FILED SEPT. 24, 1914.

1,138,411.

Patented May 4, 1915.
2 SHEETS—SHEET 1.

H. D. PRATT.
PROCESS OF HARVESTING ICE.
APPLICATION FILED SEPT. 24, 1914.

1,138,411.

Patented May 4, 1915.
2 SHEETS—SHEET 2.

Witnesses:
Villet Bunova
Charles H. York

Inventor—
Howell D. Pratt.
by his Attorneys:
Howson & Howson

UNITED STATES PATENT OFFICE.

HOWELL D. PRATT, OF PHILADELPHIA, PENNSYLVANIA, ASSIGNOR TO LINK-BELT COMPANY, OF CHICAGO, ILLINOIS, A CORPORATION OF ILLINOIS.

PROCESS OF HARVESTING ICE.

1,138,411. Specification of Letters Patent. Patented May 4, 1915.

Application filed September 24, 1914. Serial No. 863,349.

*To all whom it may concern:*

Be it known that I, HOWELL D. PRATT, a citizen of the United States, residing in Philadelphia, Pennsylvania, have invented certain Improvements in the Process of Harvesting Ice, of which the following is a specification.

The object of my invention is to rapidly and accurately harvest natural ice for storage in ice houses, or loading in cars or other carriers, with the least amount of manual labor, and with the least amount of waste. This object I attain in the following manner, reference being had to the accompanying drawings, in which:—

Figure 1:
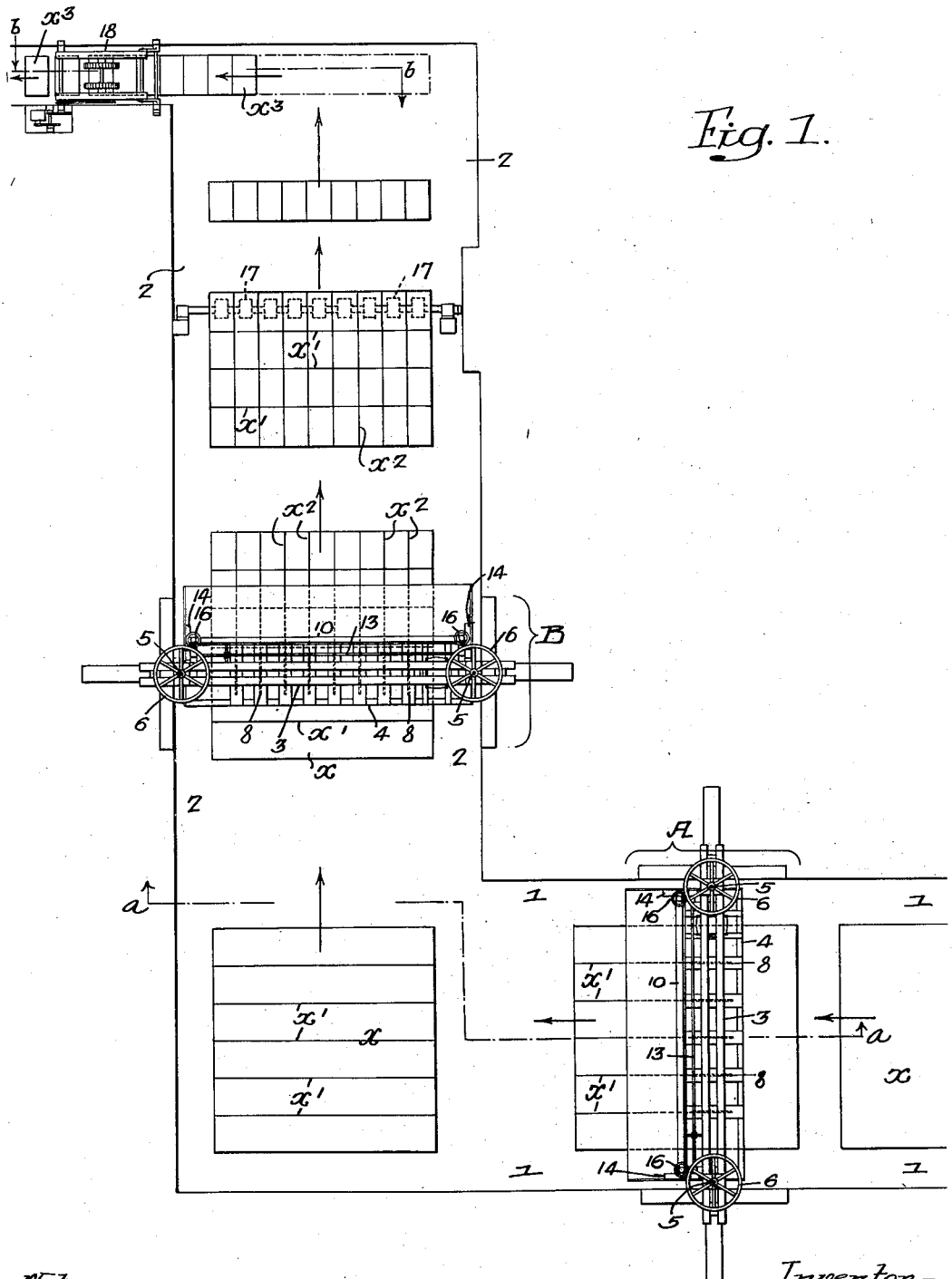
Figure 2:
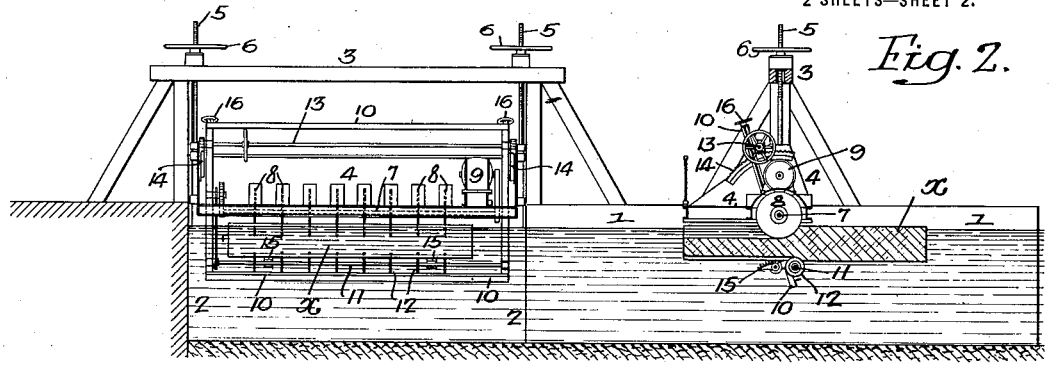
Figure 3:
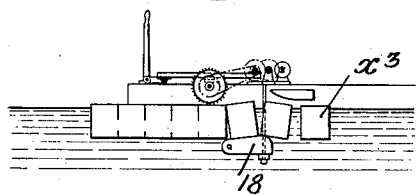
Figure 4:
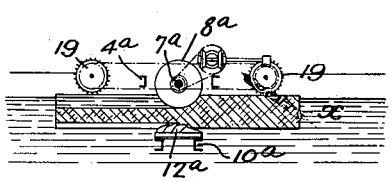
Figure 5:
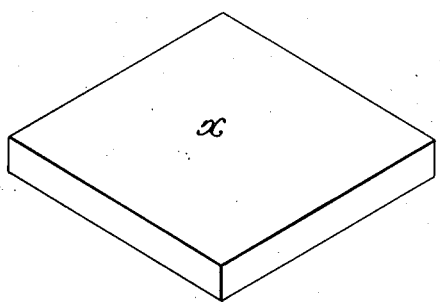

Figure 1, is a plan view illustrating the method of cutting the ice into blocks to be transferred to a storage house; Fig. 2, is a longitudinal sectional view on the line $a$—$a$, Fig. 1; Fig. 3, is a sectional view on the line $b$—$b$, Fig. 1; Fig. 4, is a view illustrating a modification of the apparatus illustrated in Fig. 1; and Figs. 5, 6, 7, 8 and 9, are diagrammatic perspective views, showing the blocks in the different stages of the process.

In harvesting natural ice considerable expense is incurred in handling and cutting the ice prior to its being stored in a storage house. The usual practice is to have a number of men to plow and saw the ice, afterward sorting it and discarding the uneven blocks at the elevator, which carries the perfect blocks to a level so that they can be transferred to the storage house. Where large blocks of ice are to be cut into smaller ones, the large blocks have to be turned and this operation requires the services of a number of men. By my invention, I quickly and economically cut the ice in proper form, reducing the waste to a minimum and materially reducing the number of operators.

At one end of a lake, or other body of water, on which ice has formed, I provide a channel 1 of a width to receive the large block $x$ of ice cut from the main body of ice on said body of water. This block is floated on the water to the channel, as shown in Fig. 1. The channel has a right angled extension 2, preferably of the same width as the channel 1 and there is a third extension, which is narrow, for the reception of a small block of ice.

Extending over the channel 1 is a frame 3 in which is a vertically adjustable saw frame 4 actuated by screws 5 having hand wheels 6 so that, on adjusting the hand wheels, the saw frame can be raised or lowered to the desired position. Mounted on the saw frame is a mandrel 7 having a gang of circular saws 8 thereon driven, in the present instance, by a motor 9. A frame 10 is pivoted to the frame 3, preferably on a line with the mandrel and, in some instances, I use the mandrel as a pivot. On the frame 10 is mounted a mandrel 11 having a series of small saws 12; this saw mandrel is driven by a chain from the main mandrel 7. On this frame is a shaft 13 having gear wheels which mesh with the teeth of the segment 14 on the main saw frame, so that this pivoted frame 10 can be adjusted to any position desired.

Carried by the pivoted frame are retarding arms 15 having teeth which engage the bottom of the block of ice and these retarding arms can be moved by a hand shaft 16 so as to increase or diminish the bearing of these retarding arms against the bottom of a block of ice. There may be as many of these retarders as desired, according to the size of the blocks of ice being cut.

Figure 6:
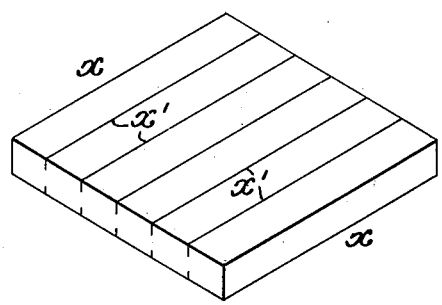
Figure 7:
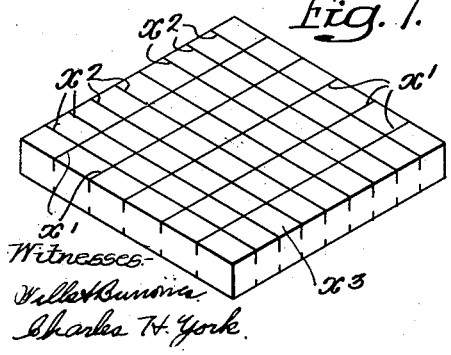
Figure 8:
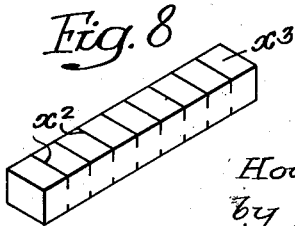
Figure 9:

The saws 8 and the saws 12 are arranged in line so that, as a block passes under the saw frame, the saws 8 will cut a series of deep kerfs in the upper surface of the block, while the saws 12 will preferably cut shallower kerfs in the block in line with the deep kerfs, leaving sufficient ice to retain the block intact while passing through the main channel 1, see Fig. 6.

The above described sawing apparatus in channel 1, I have indicated by A and there is a duplicate of this apparatus, indicated by B, in the channel 2; the saw mandrel of this apparatus being at right angles to that of the apparatus A.

The cut block of ice, after passing through the apparatus A, has the longitudinal kerfs in it, as shown at $x'$, Fig. 6, and it is then ready to be moved, in the channel 2, in the direction of the arrow, Fig. 1, and through the apparatus B without the necessity of turning the block, as these blocks are very large and are exceedingly difficult to turn. The block $x$ is then passed through the sawing apparatus B and a series of kerfs $x^2$ are cut in the face of the block at right angles to the other kerfs $x'$, dividing it into a series of small rectangular blocks, as at $x^3$, held together by a comparatively thin web of ice. The ice is then passed over a submerged breaker 17, Fig. 1, which breaks the ice into a series of long blocks, Fig. 8, which are then fed through the narrow channel and over a breaker 18, which breaks the sections $x^3$ from the long block, Fig. 3. These sections are then fed to the elevator from whence they are conveyed to the chute which distributes them to the proper storage houses.

By cutting a kerf in the bottom of the ice in line with the kerf at the top of the ice, the blocks are easily broken apart without breaking off the corners of the ice, as it will be understood that all blocks of ice, the corners of which are broken, are discarded, owing to the fact that they cannot be properly packed in a storage house.

Thus it will be seen that I am enabled to float a large block of ice, which has been cut from the main field, without turning it, and the necessary cuts are made in the ice so that it can be easily broken into small rectangular blocks for storage.

This apparatus requires but few men to operate it and, as before stated, the loss due to uneven breakage is reduced to a minimum.

In Fig. 4, I have illustrated a modification of the apparatus, in which $4^a$ is the frame, $7^a$ the main spindle and $8^a$ the gang of saws. Instead of the circular saws 12, I have substituted a series of plows $12^a$ mounted on a frame $10^a$ and use separate feed wheels 19, one in advance and the other at the rear of the saws for feeding a block of ice through the channel. The apparatus illustrated in Figs. 1, 2 and 3, forms the subject of a separate application for patent filed Sept. 24, 1914 under Serial No. 863,351, and the apparatus illustrated in Fig. 4, is also set forth and claimed in an application for patent filed Sept. 24, 1914 under Serial No. 863,350.

I claim:—

1. The process of harvesting ice, said process consisting in floating a block of ice in a channel and through a sawing apparatus; cutting a series of longitudinal kerfs in the face of the ice; moving the block of ice transversely, without turning, through another sawing apparatus which cuts another series of kerfs in the ice at right angles to the first series; and then breaking the block into smaller blocks on the lines of the kerfs.

2. The process herein described of harvesting ice, said process consisting in cutting a large rectangular block of ice from the main field; floating the ice into a right angled channel; cutting a series of longitudinal kerfs in the block of ice as it passes through one portion of the channel; then moving the block of ice laterally, without turning; passing it through the second portion of the channel; cutting a series of kerfs therein at right angles to the first series; breaking the large block into smaller blocks on the lines of the kerfs; and then passing the smaller blocks through a third channel.

3. The process herein described of harvesting ice, said process consisting in cutting a rectangular block of ice from the field; floating the block into a channel; cutting a series of longitudinal kerfs in the upper face of the block and a series of kerfs in the underside of the block in line with those on the upper side; then moving the block at an angle and cutting a series of kerfs in the upper face of the block at right angles to the first mentioned kerfs; simultaneously cutting a series of kerfs in the bottom of the block of ice; and breaking the block of ice on the lines of the kerfs, forming separate blocks.

In testimony whereof, I have signed my name to this specification, in the presence of two subscribing witnesses.

HOWELL D. PRATT.

Witnesses:
Jos. H. KLEIN,
WM. A. BARR.